United States Patent
Dewis et al.

(10) Patent No.: US 9,739,623 B2
(45) Date of Patent: Aug. 22, 2017

(54) SYSTEM AND METHOD FOR MANAGING TRANSIT SERVICE INTERRUPTIONS

(71) Applicant: Trapeze Software ULC, Mississauga (CA)

(72) Inventors: Patrick John Dewis, Calgary (CA); Dicky Sum, Calgary (CA); Christopher Elliot Pettigrew, Calgary (CA)

(73) Assignee: Trapeze Software ULC, Mississauga (CA)

( * ) Notice: Subject to any disclaimer, the term of this patent is extended or adjusted under 35 U.S.C. 154(b) by 8 days.

(21) Appl. No.: 14/883,627

(22) Filed: Oct. 15, 2015

(65) Prior Publication Data
US 2017/0108341 A1 Apr. 20, 2017

(51) Int. Cl.
*G01C 21/34* (2006.01)
*G08G 1/127* (2006.01)
*G06Q 10/06* (2012.01)

(52) U.S. Cl.
CPC . *G01C 21/3415* (2013.01); *G06Q 10/063116* (2013.01); *G08G 1/127* (2013.01)

(58) Field of Classification Search
CPC ....... G01C 21/3415; G06Q 10/063116; G08G 1/127
USPC .......................................................... 701/117
See application file for complete search history.

(56) References Cited

U.S. PATENT DOCUMENTS

| | | | | |
|---|---|---|---|---|
| 6,687,615 B1* | 2/2004 | Krull | ................. | G01C 21/3415 340/988 |
| 7,869,939 B2* | 1/2011 | Kikuchi | ................. | G06Q 10/04 340/994 |
| 9,441,981 B2* | 9/2016 | Abhyanker | ............ | G01C 21/36 |
| 2011/0301835 A1* | 12/2011 | Bongiorno | ........... | G01C 21/343 705/6 |
| 2013/0304367 A1* | 11/2013 | Stehle | ...................... | G08G 1/00 701/117 |
| 2014/0062790 A1* | 3/2014 | Letz | .................... | H04L 67/1095 342/386 |
| 2015/0241225 A1* | 8/2015 | Liu | ..................... | G01C 21/3682 701/540 |
| 2016/0063893 A1* | 3/2016 | Kanuganti | ........... | G09B 21/001 348/62 |
| 2016/0117610 A1* | 4/2016 | Ikeda | ..................... | G06Q 50/32 705/5 |

* cited by examiner

*Primary Examiner* — McDieunel Marc
*Assistant Examiner* — James E Stroud
(74) *Attorney, Agent, or Firm* — Elan IP Inc.

(57) ABSTRACT

There are systems and methods for detour segments for patterns for bus routes to be performed by a transit vehicle as part of a schedule for a day, responsive to an interruption on the pattern, the system comprising a scheduling server, configured to receive an interruption for a pattern, determine a detour segment starting point and a detour segment ending point, check a detour segment database for an existing detour segment having the detour segment starting point and the detour segment ending point and if the checking returns an existing detour segment then apply the detour segment to the pattern, according to the detour segment parameters, to create a detoured schedule.

20 Claims, 8 Drawing Sheets

SYSTEM AND METHOD FOR MANAGING TRANSIT SERVICE INTERRUPTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The invention relates generally to transit scheduling and route management. More specifically it relates to a method and system for managing schedules and routes when an event occurs that requires a transit vehicle to make a detour from its normal route.

BACKGROUND

Transit agencies must continually deal with both planned and unplanned events that disrupt transit service ("transit disruptions"). Some exemplary events that disrupt service include construction, social events such as parades or races, and weather emergencies. These disruptions result in changes to regularly scheduled transit service. Depending on its size, it is possible that a single transit disruption can affect multiple routes and schedules.

Public transit agencies must perform many steps whenever there is an interruption to their service ("service interruption"), including keeping track of the details (time and location) of the transit disruption, re-routing vehicles on routes affected by the disruption (such as via detours and/or detour patterns), and updating schedules.

The current approach to handling service interruptions is time consuming and especially difficult if multiple detours are required. Posting a schedule involves converting all stops, patterns, bus times, trips, blocks, etc. into a format that can be used by real time system components. Once a schedule is posted it becomes read-only and changes can only be made in the next "in development" schedule. Each schedule posting process increases database size by creating hundreds of thousands of changes in the database. When changes are required a schedule must be copied, edited, and re-posted. Currently, detour patterns and relocated transit stops cannot be overlaid onto a regular schedule. Schedules need to be removed from the operation of the scheduling system, replaced with alternate schedules, and then reposted when the service interruption has ended. Hence, reposting involves copying a previously posted schedule, making changes and then posting it again.

There is thus a need for a more efficient way to manage transit service when disruptions occur.

SUMMARY OF THE INVENTION

There is a system for detour segments for patterns for bus routes to be performed by a transit vehicle as part of a schedule for a day, responsive to an interruption on the pattern, the system comprising: a scheduling server, configured to: receive, from one or more interruption sources, an interruption for a pattern, the interruption comprising a part of the pattern that cannot be driven by the transit vehicle; determine a detour segment starting point and a detour segment ending point; check a detour segment database for an existing detour segment having the detour segment starting point and the detour segment ending point; if the checking returns an existing detour segment then: apply the detour segment to the pattern, according to at least one detour segment parameter, to create a detoured schedule.

If the checking does not return an existing detour segment then the system may: facilitate creating a detour segment; ingest detour segment parameters for the detour segment; apply the detour segment to the pattern, according to the detour segment parameters, to create a detoured schedule; and save the detour segment in a database of detour segments.

The checking may comprise searching the database of detour segments to determine if any detour segments therein have the same detour starting point and detour ending point and, if one or more detour segments have the same detour starting point and detour ending point, allowing selection of a detour segment.

The detour segment parameters may comprise a detour segment start time and a detour segment end time, one or more temporary stops and adherence data for the one or more temporary stops and detour time points.

The scheduling server may be further configured to: create a detoured schedule file comprising the detoured schedule; and post the detoured schedule file to an on-board computer of the transit vehicle.

The on-board computer may be further configured to revert to the schedule from the detoured schedule, based on the detour segment parameters.

The system may further comprise an on-board computer, on the transit vehicle, the on-board computer configured to: receive the detoured schedule file; and display the detoured schedule, the detour segment according to the detour segment parameters, and adherence data for the one or more temporary stops and detour time points, on a screen of the on-board computer for a transit vehicle driver to see.

The on-board computer may provide one or more route adherence notifications, comparing an actual arrival time of the bus to one or more detoured time points in the detoured schedule to the scheduled arrival time of the bus to the one or more detoured time points, to the bus driver and wherein the one or more time points comprise a temporary stop.

The detour segment parameters may further comprise an adherence scheme parameter that dictates whether the on-board computer uses schedule adherence data, detoured schedule adherence data, or no adherence data.

The scheduling server may be further configured to: determine if there is a work split between the detour segment starting point and the detour segment ending point; and if there is then: cause a new work split based on the detoured schedule.

The detoured schedule file may comprise only one or more updates to the schedule, the updates comprising the detour segment and detour segment parameters.

There is also a method for detour segments for patterns for bus routes to be performed by a transit vehicle as part of a schedule for a day, responsive to an interruption on the pattern, the method comprising: receiving from one or more interruption sources, an interruption for a pattern, the interruption comprising a part of the pattern that cannot be driven by the transit vehicle; determining a detour segment starting point and a detour segment ending point; and checking a detour segment database for an existing detour segment having the detour segment starting point and the detour segment ending point; if the checking returns an existing detour segment then: applying the detour segment to the pattern, according to the detour segment parameters, to create a detoured schedule.

The method may include if the checking does not return an existing detour segment then: facilitating the creation of a detour segment; ingesting at least one detour segment parameter for the detour segment; applying the detour segment to the pattern, according to the detour segment parameter, to create a detoured schedule; and saving the detour segment in a database of detour segments.

The method may further comprise searching the database of detour segments to determine if any detour segments therein have the same detour starting point and detour ending point and, if one or more detour segments have the same detour starting point and detour ending point, allowing selection of a detour segment.

The detour segment parameters may further comprise a detour segment start time and a detour segment end time, one or more temporary stops and adherence data for the one or more temporary stops and detour time points.

The method may further comprise creating a detoured schedule file comprising the detoured schedule; and posting the detoured schedule file to an on-board computer of the transit vehicle.

The method may further comprise reverting to the schedule from the detoured schedule, by the on-board computer, based on the detour segment parameters.

The method may further comprise receiving the detoured schedule file; and displaying the detoured schedule, the detour segment according to the detour segment parameters, and adherence data for the one or more temporary stops and detour time points, on a screen of an on-board computer for a transit vehicle driver to see.

The method may further comprise providing one or more route adherence notifications, comparing an actual arrival time of the bus to one or more detoured time points in the detoured schedule to the scheduled arrival time of the bus to the one or more detoured time points, to the bus driver and wherein the one or more time points comprise a temporary stop.

The detour segment parameters may further comprise an adherence scheme parameter that dictates whether the on-board computer uses schedule adherence data, detoured schedule adherence data, or no adherence data.

The method may further comprise: determining if there is a work split between the detour segment starting point and the detour segment ending point; and if there is then: causing a new work split based on the detoured schedule.

The detoured schedule file may comprise only one or more updates to the schedule, the updates comprising the detour segment and detour segment parameters.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
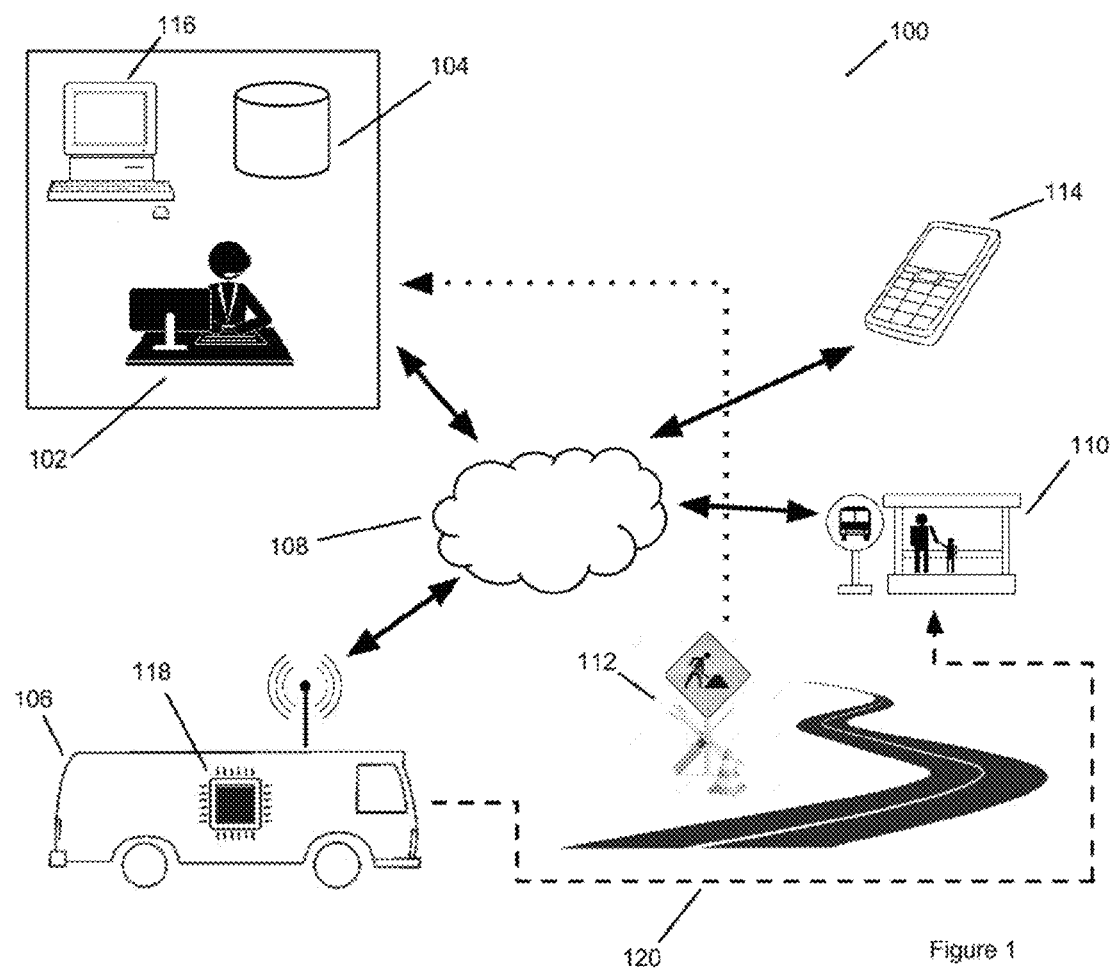
FIG. 1 is a diagram of a system for managing service interruptions according to a non-limiting embodiment of the present invention.

FIG. 1 is a diagram of a system 100 for service interruption management comprising a transit agency dispatcher 102, using a transit scheduling server 116 further comprising data storage 104, transit vehicle 106, on-board computer 118, communication network 108, transit stop 110, transit disruption 112, rider communication device 114, and routes 120.

System 100 allows transit agencies to more efficiently and accurately provide transit services where transit disruptions, and resultant service interruptions, may be part of one or more transit services or routes being provided to riders via one or more schedules.

Dispatcher 102 may be a person involved in scheduling and monitoring transit services being provided by a transit agency. Dispatcher 102 may be capable of managing service interruptions including creating schedules, service interruption files, and detour patterns, such as via use of elements of system 100. Dispatcher 102 may manage service interruptions via one or more software components (including applications and database components, for example), and hardware components (including processors, RAM, ROM and the like) such as transit scheduling server 116 and data storage 104 which may include a detour database (not shown).

Scheduling server 116 may provide various functionality relating to the provision of transit services—alone or in combination with other elements of system 100. For example, scheduling server 116 may perform adherence monitoring—in combination with data that may be received from transit vehicle 106. In performing a route transit vehicle 106 may obtain its GPS location at various times/points (such as at waypoints along the route). This may allow on-board computer 118 or scheduling server 116 to compare the time to the intended (scheduled) time for that transit vehicle 106 to arrive at that waypoint. If they are early or late some form of notice or alarm may occur. Of course for adherence to be meaningful accurate and timely data needs to be captured, and relevant scheduled times need to exist and be available for comparison. Scheduling server 116 may thus need to establish, such as via dispatcher 102, relevant scheduled times on detour.

Transit agencies may be agencies that have a transit network (generally a network of routes and coverage for the provision of transit services) and offer transit services. Transit networks, and components thereof, may be definable via GPS coordinates, for example. Transit agencies may have demand-response riders and fixed route riders that may be registered (such as having a profile stored by the transit agency) or unregistered.

Data storage 104 may include one or more computers, (I/O, CPU, memory) either local or connected via a network such as via part of communication network 108, capable of storing data files for, including but not limited to, service interruptions, schedules, patterns, and detour related data.

Transit vehicle 106 is a vehicle that provides, or relates to the provision of, transit services. Transit vehicle 106 may include buses, para-transit (demand response) vehicles, maintenance vehicles, supervisory vehicles (such as cars or vans driven by supervisors) or a light rail/TRAM vehicles. Transit vehicle 106 has many systems running thereon, as known in the art, such as engines, brakes, audio announcement technology, signage, passenger counting, and the like. Transit vehicle 106 may be operated by one or more operators/drivers during a given day and may perform a run (from pull out in the morning to return in the evening) that may comprise one or more routes 120, patterns, and pieces of work (when a new operator takes over a new piece of work commences, regardless of whether that is at the end of a route or pattern or somewhere in the middle, which is called a work split point).

Routes 120 may be demand response routes (that are typically variable on any given day) or fixed routes (that do not generally vary). Fixed routes may include several patterns for each route (where patterns for a route may have different end points, start points, or the like, but otherwise travel the same routes and stop at the same stops, for example).

Routes 120 may generally be targeted to take a particular amount of time to drive, and may have several time points or waypoints, as described herein, where it may be possible to determine whether transit vehicle 106 is running early, late, or on-time, relative to the timed schedule. Such schedule adherence information may be useful for dispatchers (for example to understand how connections may be made to other transit services), for transit vehicle operators/drivers (for example to know if they should try to reduce their pace) and for riders (for example to be able to receive information about whether their transit vehicle 106 is expected to arrive at their stop 110 on time).

Fixed routes may also include "trippers"—vehicles that drive a route, or a part thereof, but are not part of a schedule and are just added to handle excess passenger load. A tripper may be added to handle the end of a concert for example. A tripper may have the same start and end point of the route it is travelling or it may start or end at different points—for example to start at the location of the concert and end at a parking lot some number of stops away from the concert venue (despite the route continuing past the stop near the parking lot).

Transit vehicle on-board computer 118 is a computing device that may provide the user interface to functionality relating to the provision of transit services and operation of transit vehicle 106. On-board computer 118 may often be located on transit vehicle 106, but may be removable therefrom. Operators of transit vehicle 106 may be some of the primary users of on-board computer 118. On-board computer 118 may communicate with communication network 108. On-board computer 118 may have GPS units therein, allowing transit vehicle 106's location and movements to be determined and communicated to other parts of system 100.

On-board computer 118 may further have software located thereon. Such software may include the ability to determine and/or provide adherence data. This may be accomplished, for example, by on-board computer 118 receiving a schedule (or detoured schedule file) that may include various time points (waypoints), including detoured segment time points. It may then determine when it has arrived at such waypoints and compare that to its scheduled arrival time (which may include scheduled arrival times for detoured segment time points, obtained via the detoured schedule file, and updated or adjusted regular time points affected by the interruptions, again updated via the detoured schedule file), and of course may do this predictively as well. On-board computer 118 may distribute such adherence information, for example on its display or screen to the operator, to scheduling server 116, and to riders. Such distribution may be affected by an adherence scheme parameter that dictates whether the on-board computer uses schedule adherence data (i.e. continues announcing and otherwise using adherence data from the regular schedule, ignoring the detour), detoured schedule adherence data (comprising adherence data for temporary stops and/or time points, possibly in combination with regular adherence data or modified regular adherence data), or no adherence data (effectively turning off adherence data and notifications).

Transit disruption 112 may cause off route events, where on-board computer 118 may determine that transit vehicle 106 has left the route it was to be on. As a result an off route event may be triggered within on-board computer 118. An off route event may cause actions on on-board computer (i.e. displays to the operator that they are off-route) and may be provided back to scheduling server 116 (in conjunction with, or separate from regular positioning signals).

On-board computer 118 may thus have many triggered off route events, or may function in "planned off route" mode and/or "on detour" mode—where off route events may be stopped or disabled. "Planned off route" may tell on-board computer to suppress triggers. "On detour" mode may signal to an on-board computer that the regular pattern has been modified and the resulting detour pattern should be used for calculation of all triggers (for example, triggers based on the path and/or timing of the detour pattern).

Communication network 108 may be substantially any public or private network, wired or wireless, and may be substantially comprised of one or more networks that may be able to facilitate communication between themselves and between the various parts of system 100.

Transit stop 110 may be a location where a rider may get on or off of a transit vehicle 106. Such may include stops, transfer locations, stations, and the like. It may include an electronic sign that may display information relating to a transit agency's transit services, such as routes, route and schedule adherence, rider information, advertising information, and the like, and may be able to communicate with dispatcher 102, for example via communication network 108. In demand-response applications, transit stop 110 may be a pick up or drop off location for a rider, such as a rider's home or doctor's office.

Transit stop 110 may be either a "permanent stop" or a "a temporary stop". A permanent stop is a stop along the route that is likely to remain in use for an extended period of time. It is part of the regularly scheduled service. Permanent stops may sometimes be skipped (optionally or by necessity) during a service interruption. A temporary stop is a point on the detoured segment of a route that only exists while there is a service interruption. A temporary stop may also be a permanent stop that has been temporarily relocated during a detour. Transit stops 110 may be waypoints. Other waypoints include intersections, forks in the road or other decisions about a route, or other critical points along a street or route.

Rider communication devices (RCD) 114 may be substantially any computing device (such as a tablet, mobile smart phone, laptop, etc) that may allow a riders to receive, through one more applications, information related to the transit disruption and transit schedules from the transit agency via the communication network 108. In one embodiment of the invention RCDs 114 may be configured to execute an application that allows users to receive inputs describing a transit disruption with real-time information from the transit scheduling server 116.

Transit disruption 112 may be a planned or unplanned event that may force a transit vehicle 106 to deviate from its normal pattern for example to continue full or limited service. Examples may include road closures due to construction, social events such as parades or races, and weather emergencies.

Transit disruption 112 may result in one more service disruptions or detour patterns—changes to the existing schedule to address or accommodate the transit disruption, which may result in a detoured schedule. Service disruptions may be applied to various routes, as described herein, and posted to a live schedule (i.e. a detoured schedule is posted or various detour patterns, "updates", are posted to the existing schedule to create a modified schedule akin to a detoured schedule) based on various rules and parameters (such as detour segment parameters), as described herein. Each route may have one or more "active" service disruptions at any given time, providing various service disruption rules are followed (such as there being no overlap between service disruptions, as described herein). Each service disruption may be used by one or more routes, again provided rules are adhered to. This may allow efficient re-use of service disruptions to facilitate efficient implementation of service disruptions to address transit disruptions. When a disruption 112 is added to a schedule a new schedule file (detoured schedule file) may be provided to the appropriate on-board computer 118 and may include waypoints for the detour (such as detour time points, that may be derived as described herein such as by interpolating along a detour segment based on speed and traffic flow for a particular time) and/or modified waypoints for the rest of the regular schedule (for example if the detour affects the rest of the timing, not just the path).

Figure 2:
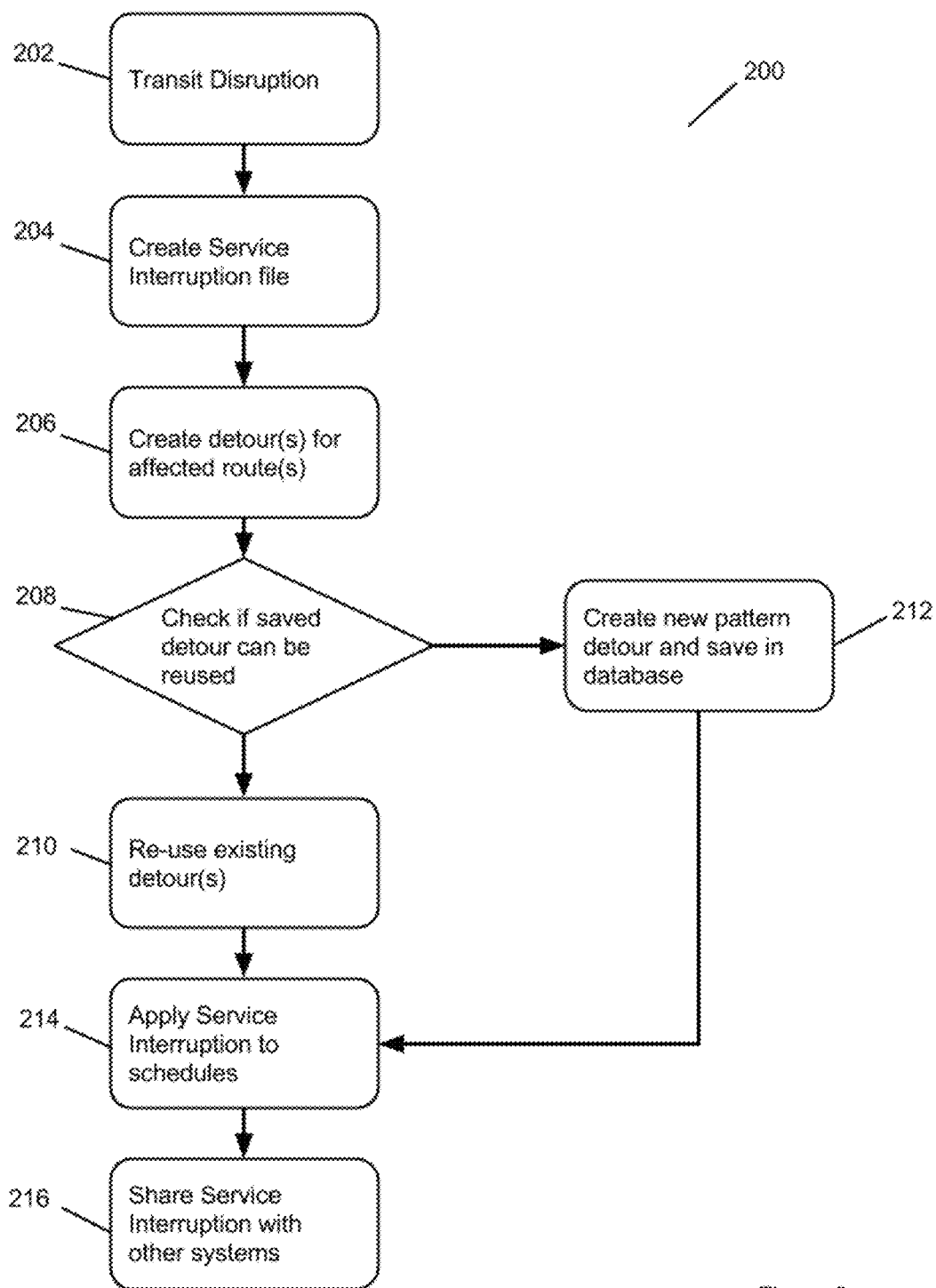
FIG. 2 is a flowchart showing a method for managing a service interruption according to a non-limiting embodiment of the present invention.

FIG. 2 shows method 200, which is an embodiment of a method for using service disruptions in the provision of transit services.

Method 200 begins at 202 where the transit agency becomes aware of some transit disruption 112. The dispatcher 102 may be informed of the transit disruption 112 in any number of ways, from any number of sources (each an "Interruption Source"). Exemplary Interruption Sources include:
  one or members of a transit agency monitoring traffic patterns and noting transit disruptions, for example via software tools that are part of;
  news reports or feeds of current events, weather, and the like, for example identifying a gas leak at a particular street address;
  riders or drivers of transit vehicles 106 providing information, for example via RCD 114.

At 204, a service interruption dataset or file ("service interruption") may be created that may contain a detoured schedule and/or specific detour segment pattern parameters unique to that transit disruption or service interruption, for example:
  1) Name of the service interruption, for example for searching;
  2) Description of the transit interruption and/or service interruption;
  3) State, for example "Ready" or "Not Ready" or "Active"/"Inactive", to indicate one or more states of the service interruption such as whether it is currently in use by a route. The state may determine whether modifications may be made to the file, for example, when in the 'READY' state, further changes to service interruption file may not be permitted. Further, the service interruption file may not be set from 'READY' to 'NOT READY' when certain conditions are true, for example if the schedule or service interruption have started. Setting the service interruption file from 'NOT READY' to 'READY' may require certain conditions to be satisfied, for example: ensuring multiple service interruptions defined in a single schedule do not overlap geographically, ensuring valid date ranges, valid stops, etc. For example, two different detour segments may share a common geographic route around a single transit disruption, but both segments may not be set to 'READY' at the same time because of an overlap. Further, the system may perform other conflict checks before the file can be set to 'READY' and may produce warnings.
  4) Start Date/Time of the service interruption;
  5) Optional End time if an end time is known (such as a parade will end at a particular time, where if the end time is left blank, the service interruption may not end until the dispatcher 102 changes the end time or state). This may allow reversion to a "normal" schedule.
  6) Optional time-frame element so that service interruptions may be active for a certain number of hours, days, or seasons (for example, from June 1, to June 5 between the hours of 8:00 am and 4:00 pm). This may allow reversion to a "normal" schedule.

Creating the service interruption dataset at 204 may further comprise performing one or more service interruption validations, such as:
  (a) No overlap;
  (b) No duplication;
  (c) Valid effective dates.

The service interruption may be stored on the data storage 104 upon creation.

At step 206 a geographical path of the detour pattern may be designed for a selected pattern. This may involve selecting a start point and end point, for example.

At step 208 there may be an option to re-use an existing detour segment saved in the data storage 104. A search of existing detour segments is performed and there is a check to determine if: 1) the start and end points of any saved segment pattern match the start and end points of the current segment pattern, and 2) if the same saved detour segment uses existing stops from a schedule, the schedule of the current segment pattern also contains these stops.

At step 210 if the search returns a detour segment that satisfies the above conditions, the stored detour segment may be re-used.

At step 212, if no existing detour segment matches the criteria, or if a new detour segment is desired, a new detour segment may be designed by the dispatcher 102. To design the detour segment, dispatcher 102 may use a GUI with a map display to choose points that "draw" a route. The points comprising the detour segment may be waypoints, new temporary stops, existing temporary stops, or existing permanent stops. Times may be interpolated for stops on the detour segment based on the last point before the segment and the first one after.

At step 216, newly created detour segments may be saved in a database or data storage 104 for future use, and may later be shared by detour patterns from different schedules.

At step 214, the service interruption may be set to 'READY' and applied to a schedule (as described herein, for example by providing a detoured schedule in a detoured schedule file or via "updates" or changes to the schedule that are provided in a detoured schedule). Service interruptions and/or detoured schedules may include a detour segment parameter to allow reversion to the original scheduled based on some measurement (such as time, distance, and the like). This may simplify application and removal (reversion) of the application of a detoured schedule addressing detour patterns.

Each schedule may have a 'READY' and 'NOT READY' state. Once a 'READY' service interruption is associated with a schedule, the schedule may then be set to 'READY' so as to prevent further changes to the service interruption for that schedule and so the service interruption can be applied, or posted, to the schedule/route.

Information pertaining to the changes in schedules and detours due to the service interruption may be sent to transit stops 110 and transit rider communication devices 114 via the communication network 108. Alternatively information being sent to stops and RCD may require manual input and approval from dispatcher 102 or may follow various rules that seek to balance accuracy, communication costs, efficiency, and rider information.

Figure 3A:
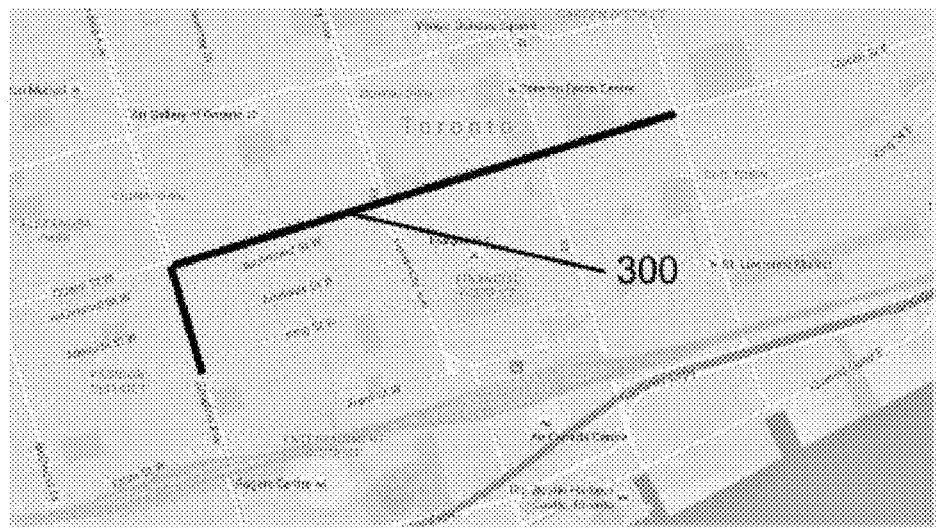
FIGS. 3a and 3b are diagrams of a normal transit pattern and a detour pattern respectively, displayed on a map according to a non-limiting embodiment of the present invention.

FIG. 3(a) is a diagram of a normal transit pattern 300 without any disruptions.

Figure 3B:
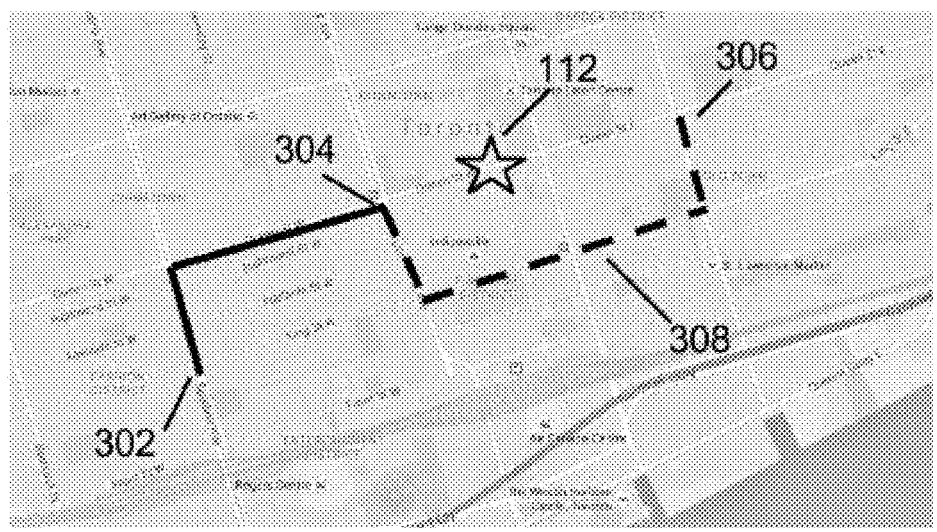

FIG. 3(b) is a diagram of a detour pattern 302, which is the resulting pattern after a detour has been applied to pattern 300, comprising transit disruption 112, detour pattern start point 304, detour pattern end point 306, and one or more detour segments 308.

The detour pattern start point 304 and detour pattern end point 306 may be selected by choosing from a list of preset locations or by choosing points on a map screen using a GUI. Start and end points may be any waypoint and may include permanent or temporary transit stops Detour segment 308 may be the part of the detour that differs from the original pattern 300 and may represent a path the transit vehicle will follow during a detour. It contains a continuous list of detour geographical points which begins at the detour pattern start point 304 and finishes at the detour pattern end point 306.

Information about the service interruption and associated schedules and detour pattern may also be sent to transit vehicle on-board computer 118 via the communication network 108.

Figure 4:
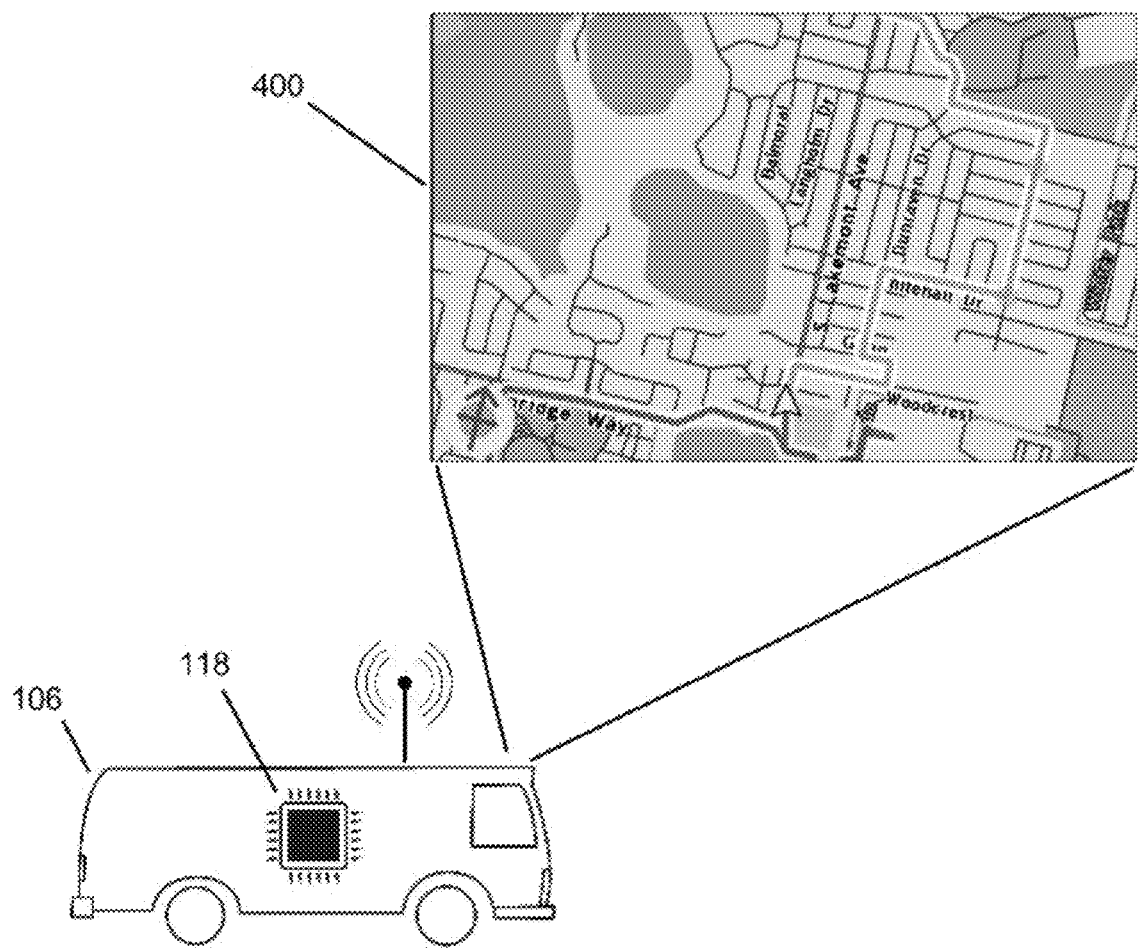
FIG. 4 is a an example of a screenshot that may appear on a transit vehicle on-board display according to a non-limiting embodiment of the present invention.

FIG. 4 is an example screenshot that may appear on a transit vehicle 106 display, such as a GPS or an on-board computer's application (which may involve turn-by-turn instructions, such as with a GPS application), which may show the vehicle's position while on the detour pattern. Display 300 may show a map screen that may include the transit vehicle 106 route, one or more detour segments which may be highlighted in different colors.

The system may share information related to the service interruption with other transit agency systems.

Figure 5:
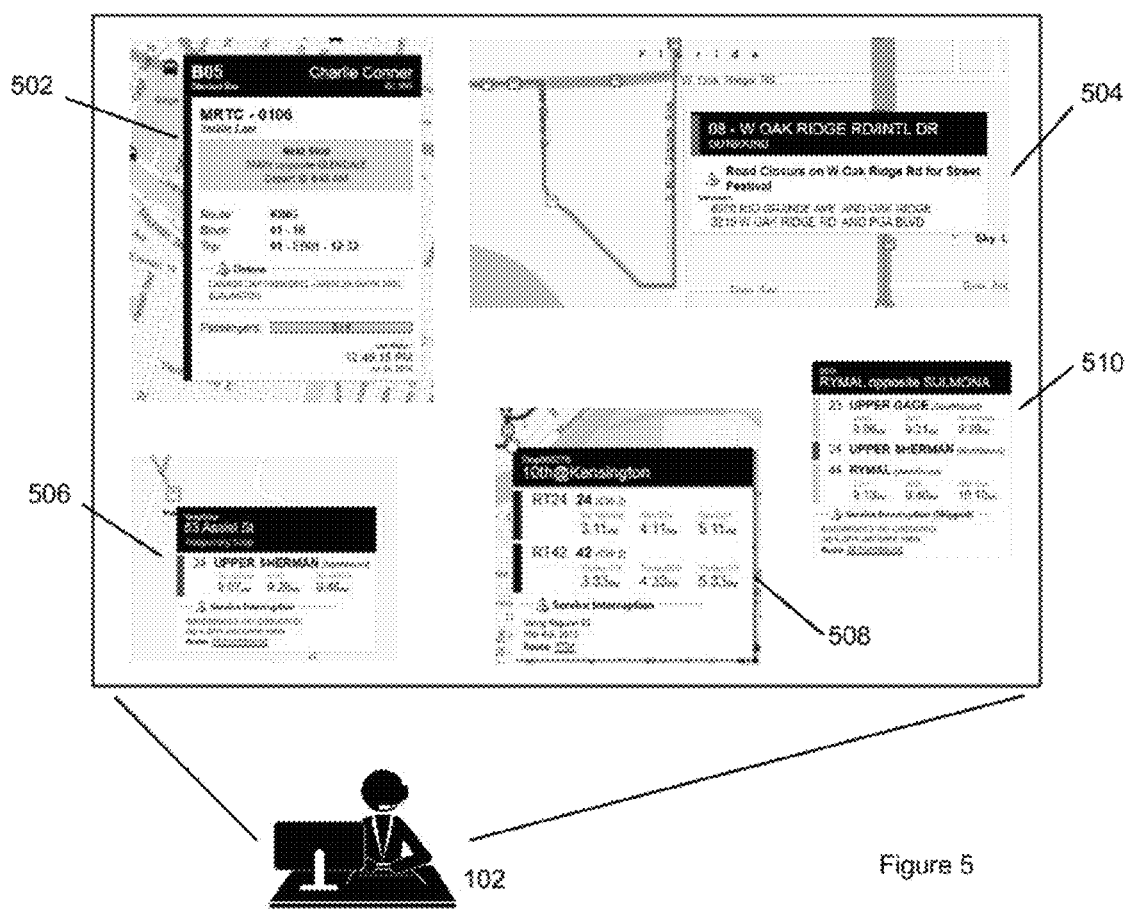
FIG. 5 is a diagram of one or more displays a dispatcher may see on a graphical user interface when there are active service interruptions, according to a non-limiting embodiment of the present invention.

FIG. 5 is a representation of some of the features a dispatcher 102 may see on a graphical user interface when there are active service interruptions. The interface may display information related to active service interruptions such as text, icons, symbols, and the like, ("Service Interruption Information"). The dispatcher 102 may use the graphical user interface and may view various pop-up windows ("Tooltips") when selecting different areas on the GUI map.

The interface may include a map 504 that shows an original pattern highlighted in one color, and a detour segment portion highlighted in a different color. Other ways to show an original pattern versus a detour pattern are considered within the scope of the present invention, such as via different dashed lines, thicknesses, and the like.

The interface may include a vehicle Tooltip 502, which may display Service Interruption Information related to a particular vehicle when that vehicle is travelling along a detour.

As can be seen in vehicle Tooltip 502, schedule adherence information can be seen that shows how close to schedule the transit vehicle is. This adherence may be accomplished in a number of ways, including using GPS, waypoints, and the like. Where no detours are experienced, one or more "events" may be triggered (such as by MDT and/or scheduling server 116).

The interface may include a temporary stop Tooltip 506, which may display the Service Interruption Information related to a particular stop.

The interface may include a regular stop Tooltip 508, which may display the Service Interruption Information related to a particular stop.

If scheduled stop is skipped by a detour, the Service Interruption Information may be displayed in the stop tooltip 510.

Figure 6:
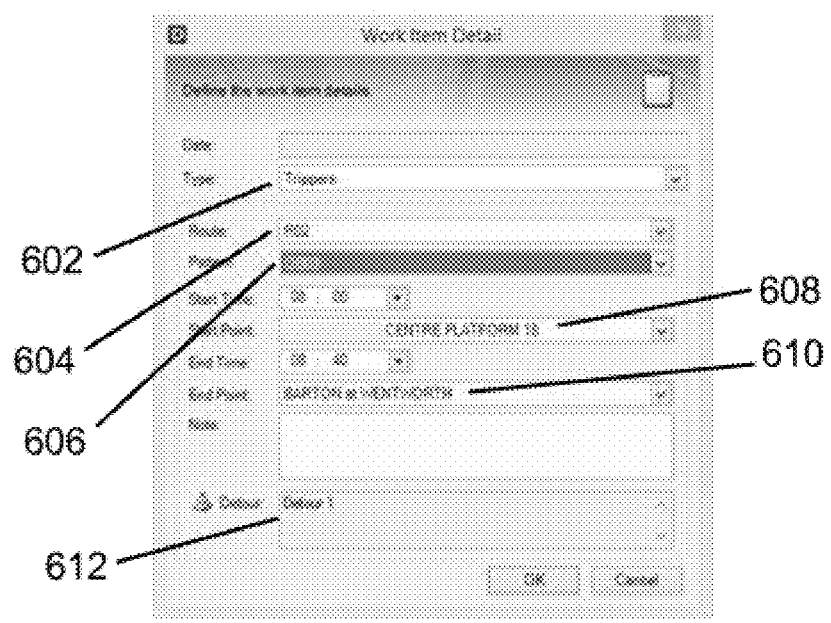
FIG. 6 is a diagram of a display a dispatcher may see on a graphical user interface in scheduling trippers, according to a non-limiting embodiment of the present invention.

FIG. 6 is a diagram of a display 600 that may be shown on a graphical user interface in scheduling trippers. Display 600 allows adding a work item, for example by a dispatcher. In the example shown in FIG. 6, the work type 602 is a tripper and the tripper is going to perform route R02 (as seen in 604) and pattern OB03 (as seen in 606). Display 600 shows the dispatcher, at 612 that route R02 and pattern OB03 are subject to a detour (Detour 1). Thus the tripper being scheduled will have to follow Detour 1. A start time and end time may be specified for the tripper being scheduled (and such times will be validated to ensure that Detour 1 will still be in effect during performance of such tripper). A start point and end point may further be specified for the tripper, which may be the same as the start and end points for the route and pattern, or not. The tripper start point and tripper end point may be stops on the route and pattern. The tripper start and end points may be selectable via drop down menus 612 and 614. The options presented in drop down menus may take into account any stops that are no longer available due to a detour, or temporary stops that may be used. If the tripper start point and end point are different than the route/pattern start point and end point then drop down menus may also only present permanent and/or temporary stops that the tripper will visit between the tripper start point and tripper end point.

Figure 7:
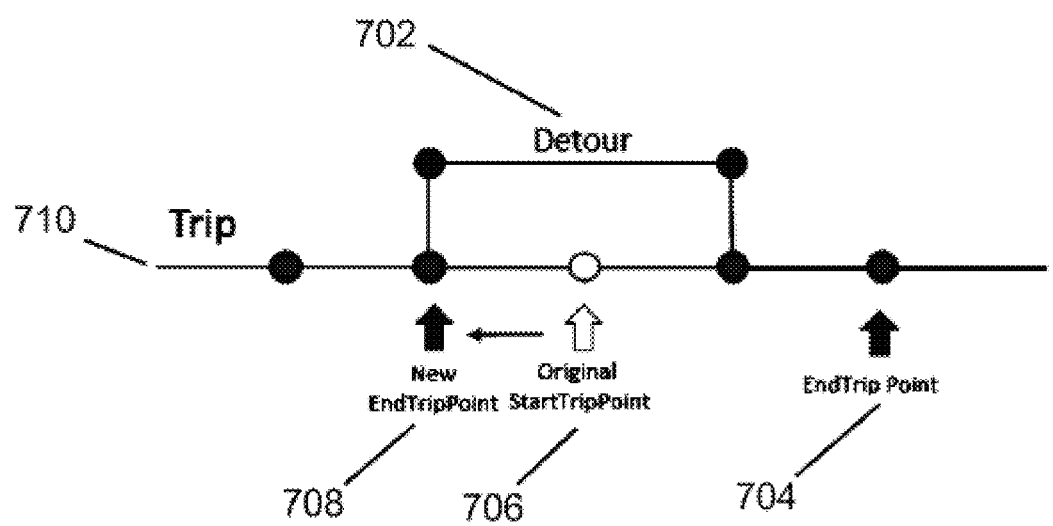
FIG. 7 is a diagram of handling trippers on detoured routes, according to a non-limiting embodiment of the present invention.

FIG. 7 is a diagram of handling trippers on detoured routes. As described herein, a tripper may be schedule for route 710. Route 710 may have detour 702 that skips stop 706, which may also have been the original tripper start point. As a result the trippers original start point 706 may be moved to new start point 708. This may be done automatically (such as to move the start point to the nearest geographically nearest stop, the nearest stop from a time perspective, or some such similar approach) and/or manually.

Of course it is to be understood that start points or end points may be affected by detours. It is further to be understood that altering of start points and/or end points may be done after a tripper is scheduled (for example if a detour is applied to a route and then the trippers that are already scheduled for that route/patter are altered) or before/as a tripper is being scheduled (which may be as shown in FIG. 6).

Figure 8:
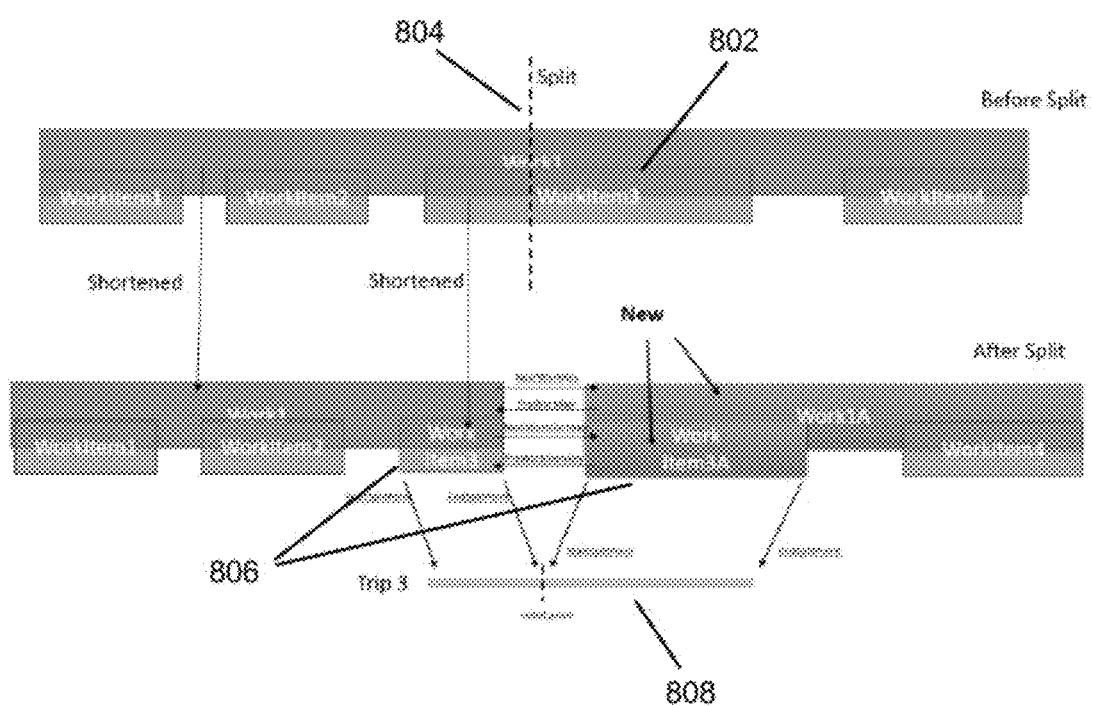
FIG. 8 is a diagram of handling work-split items for detoured routes, according to a non-limiting embodiment of the present invention.

FIG. 8 is a diagram of handling a split work among multiple transit vehicle drivers. Transit vehicles may have more than one driver during a run (from pull out to pull in). A work item 802 represents a body of work that will have to be performed by one or more drivers driving one more routes. A transit vehicle driver may take over for another driver at a work split transfer stop 804. A detour may sometimes be applied to a route so that a transfer stop 804 has been skipped. When this occurs, the two split work items 806 will merge back together into a single work item 808 and a new work split transfer stop may have to be determined by a redo of the work split. This new work split transfer may occur before the detour, after the detour, or at a point along the detour.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A system for detour segments for patterns for bus routes to be performed by a transit vehicle as part of a schedule for a day, responsive to an interruption on the pattern, the system comprising:
 a scheduling server, configured to:
  receive, from one or more interruption sources, an interruption for a pattern, the interruption comprising a part of the pattern that cannot be driven by the transit vehicle;
  determine a detour segment starting point and a detour segment ending point;
  check a detour segment database for an existing detour segment having the detour segment starting point and the detour segment ending point;
  if the checking returns an existing detour segment then:
   apply the detour segment to the pattern, according to at least one detour segment parameter, to create a detoured schedule;
  create a detoured schedule file comprising the detoured schedule; and
  post the detoured schedule file to an on-board computer of the transit vehicle.

2. The system of claim 1 wherein if the checking does not return an existing detour segment then:
 facilitate creating a detour segment;
 ingest detour segment parameters for the detour segment;
 apply the detour segment to the pattern, according to the detour segment parameters, to create a detoured schedule; and
 save the detour segment in a database of detour segments.

3. The system of claim 2 wherein the checking comprises searching the database of detour segments to determine if any detour segments therein have the same detour starting point and detour ending point and, if one or more detour segments have the same detour starting point and detour ending point, allowing selection of a detour segment.

4. The system of claim 1 wherein the detour segment parameters comprise a detour segment start time and a detour segment end time, one or more temporary stops and adherence data for the one or more temporary stops and detour time points.

5. The system of claim 4, wherein the on-board computer is further configured to revert to the schedule from the detoured schedule, based on the detour segment parameters.

6. The system of claim 4 further comprising an on-board computer, on the transit vehicle, the on-board computer configured to:
 receive the detoured schedule file; and
 display the detoured schedule, the detour segment according to the detour segment parameters, and adherence data for the one or more temporary stops and detour time points, on a screen of the on-board computer for a transit vehicle driver to see.

7. The system of claim 6 wherein the on-board computer provides one or more route adherence notifications, comparing an actual arrival time of the bus to one or more detoured time points in the detoured schedule to the scheduled arrival time of the bus to the one or more detoured time points, to the bus driver and wherein the one or more time points comprise a temporary stop.

8. The system of claim 6 wherein the detour segment parameters further comprise a adherence scheme parameter that dictates whether the on-board computer uses schedule adherence data, detoured schedule adherence data, or no adherence data.

9. The system of claim 1 wherein the scheduling server is further configured to:
 determine if there is a work split between the detour segment starting point and the detour segment ending point; and
 if there is then:
  cause a new work split based on the detoured schedule.

10. The system of claim 4 wherein the detoured schedule file comprises only one or more updates to the schedule, the updates comprising the detour segment and detour segment parameters.

11. A method for detour segments for patterns for bus routes to be performed by a transit vehicle as part of a schedule for a day, responsive to an interruption on the pattern, the method comprising:
 receiving from one or more interruption sources, an interruption for a pattern, the interruption comprising a part of the pattern that cannot be driven by the transit vehicle;
 determining a detour segment starting point and a detour segment ending point; and
 checking a detour segment database for an existing detour segment having the detour segment starting point and the detour segment ending point;
 if the checking returns an existing detour segment then:
  applying the detour segment to the pattern, according to the detour segment parameters, to create a detoured schedule;
 creating a detoured schedule file comprising the detoured schedule; and
 posting the detoured schedule file to an on-board computer of the transit vehicle.

12. The method of claim 11 wherein if the checking does not return an existing detour segment then:
 facilitating the creation of a detour segment;
 ingesting at least one detour segment parameter for the detour segment;

applying the detour segment to the pattern, according to the detour segment parameter, to create a detoured schedule; and saving the detour segment in a database of detour segments.

13. The method of claim 12 wherein the checking further comprises searching the database of detour segments to determine if any detour segments therein have the same detour starting point and detour ending point and, if one or more detour segments have the same detour starting point and detour ending point, allowing selection of a detour segment.

14. The method of claim 11 wherein the detour segment parameters further comprise a detour segment start time and a detour segment end time, one or more temporary stops and adherence data for the one or more temporary stops and detour time points.

15. The method of claim 14, further comprising reverting to the schedule from the detoured schedule, by the on-board computer, based on the detour segment parameters.

16. The method of claim 14 further comprising:
receiving the detoured schedule file; and
displaying the detoured schedule, the detour segment according to the detour segment parameters, and adherence data for the one or more temporary stops and detour time points, on a screen of an on-board computer for a transit vehicle driver to see.

17. The method of claim 16 further comprising providing one or more route adherence notifications, comparing an actual arrival time of the bus to one or more detoured time points in the detoured schedule to the scheduled arrival time of the bus to the one or more detoured time points, to the bus driver and wherein the one or more time points comprise a temporary stop.

18. The method of claim 16 wherein the detour segment parameters further comprise an adherence scheme parameter that dictates whether the on-board computer uses schedule adherence data, detoured schedule adherence data, or no adherence data.

19. The method of claim 11 further comprising:
determining if there is a work split between the detour segment starting point and the detour segment ending point; and
if there is then:
causing a new work split based on the detoured schedule.

20. The method of claim 14 wherein the detoured schedule file comprises only one or more updates to the schedule, the updates comprising the detour segment and detour segment parameters.

* * * * *